Patented Apr. 25, 1950

2,505,318

UNITED STATES PATENT OFFICE 2,505,318

RECOVERY AND PURIFICATION OF ANTIBIOTICS

Harvey E. Alburn and Eric G. Snyder, Philadelphia, Pa., assignors to Wyeth Incorporated, Philadelphia, Pa., a corporation of Delaware No Drawing. Application January 9, 1946, Serial No. 640,140

12 Claims. (Cl. 167—65)

This invention relates to the recovery and purification of antibiotics. More specifically, it relates to a two-step method of purification of streptomycin or streptothricin involving activated-carbon treatment of a solution of the antibiotic in combination with a subsequent selective precipitation; the peculiar features of this method adapt it particularly to the treatment of eluates of broth adsorbates obtained in the production of streptomycin or streptothricin, and the resulting combination of steps constitutes a new and advantageous antibiotic recovery method.

Streptomycin and streptothricin are complex organic nitrogen bases possessing valuable antibiotic properties. They are, respectively, products of the like processes of the microorganisms *Streptomyces griseus* and *Actinomyces lavendulae*, and are found dissolved in culture broths on or in which the organisms are grown. These antibiotics may be recovered by treating clarified broth with an activated carbon adsorbent such as an appropriate grade of Nuchar (Virginia Pulp and Paper Co.), Norit (American Norit Co.), Darco (Darco Corp.), or the like, and eluting the carbon with dilute methanolic hydrogen chloride after washing the carbon successively with water, acetone and methanol. The elution may advantageously be carried out in two steps. The eluates, separately or combined, may then be adjusted to a pH of 6–6.5, settled, clarified and concentrated at a low temperature by vacuum distillation.

The crude hydrochloride of the antibiotic may be precipitated from the concentrated residue by the addition of 2–3 volumes of ether or 10–15 volumes of acetone. Usually the precipitate is redissolved in methanol and reprecipitated.

Streptomycin and streptothricin are quite similar in many of their physical and chemical properties, such as in their solubility in water, lower alcohols and lower ketones, in their adsorbability, and in their reactions as organic bases with acids. Accordingly, the present invention may be applied to the recovery and purifications of either one. Biologically, however, streptomycin and streptothrycin differ and are readily distinguishable by objective tests. For example, their toxicities to higher animals differ, their antibiotic actions on microorganisms—"bacterial spectra"— are different, and streptomycin is, but streptothricin is not, inhibited by cysteine in antibiotic activity.

At present streptomycin appears to be clinically the more important of the two antibiotics, and our invention will be illustrated chiefly by application to its recovery and purification. The application of the invention to streptothricin, however, will also be illustrated.

In the case of streptomycin the separated and dried precipitate obtained as described above is a crude streptomycin hydrochloride preparation generally having a potency of approximately 35 to 70 units per milligram(u./mg.) but occasionally running as high as 100 u./mg. or more. The potency appears to depend to a considerable extent on the potency of the broth and varies in the same sense. Typical broths have potencies of approximately 40 to 100 u./ml. The potency also varies, roughly, inversely as the yield, higher potencies being obtainable under modified conditions with a sacrifice of yield.

The potency of streptomycin preparations, both solid and in solution, is determined by an agar-cup method similar to that used in assaying penicillin, the test microorganism used for streptomycin being *B. subtilis*. Comparison is made with a standard preparation referred ultimately to a crystalline streptomycin base as unity, i. e. 1000 u./mg., the "unit" being one microgram of crystalline base.

Present tentative minimum specifications call for a streptomycin product having a potency of at least 200 u./mg., substantially free of pyrogenic and histamine effect, and non-toxic.

Various methods have been proposed for purifying crude streptomycin and steptothricin. Preparations of the former of high potency and purity have been reported. For example, Fried and Wintersteiner (Science, 101, 613–615, June 15, 1945) used the so-called reineckate for purification, a crystalline salt resulting from reaction of streptomycin with Reinecke salt, $NH_4[Cr(SCN)_4(NH_3)_2]$. Kuehl et al. (Science, 102, 34–35, July 13, 1945) report the preparation of a crystalline helianthate by treating in aqueous methanol solution of highly purified streptomycin hydrochloride with methyl orange. The helianthate may be converted to a hydrochloride having a potency of 800 u./mg. Peck et al. (J. Am. Chem. Soc., 67, 1866–1867, October 1945) report the preparation of a crystalline streptomycin-$CaCl_2$ double salt by treating the hydrochloride or helianthate with methanolic $CaCl_2$. Carter et al. (J. Biol. Chem., 160, 337–342, September 1945) report on a chromatographic method of obtaining streptomycin fractions of high potency—520–900 u./mg. Similar chemical purification methods have been published for streptothricin.

These reported methods prove that it is possible to produce streptomycin and streptothricin preparations of high potency and purity. They all, however, appear to require a starting material of relatively high potency or to involve the use of unusual reagents or complicated equipment or to require extensive and careful control in operation or to result in a low yield of product. They all appear to be methods of a laboratory type; none appears to combine the simplicity of operation, employment of cheap readily available materials and ability to give high yields of product desirable in a large-scale commercial operation.

It is one object of our invention to provide a simple and economical method of increasing the potency of streptomycin or streptothricin preparations.

It is another object of our invention to provide a method of streptomycin or streptothricin purification which requires only relatively cheap and readily available materials.

It is a further object of our invention to provide a method of producing a high yield of streptomycin or streptothricin of greatly increased potency from crude streptomycin or streptothricin of relatively low potency.

Other objects and advantages of our invention will be apparent from the following description.

According to our invention, we obtain streptomycin or streptothricin of increased potency respectively from crude streptomycin or streptothricin by a two-step treatment of a solution of the crude antibiotic, such as the eluate of the adsorbate from the broth obtained in conventional streptomycin or streptothricin production as described above. The two steps of our purification are (1) treatment of the solution with activated carbon under specific conditions, and (2) selective precipitation of streptomycin or streptothricin from the filtrate from step (1).

We have discovered, for example, that if a dilute, approximately neutral methanol solution of crude streptomycin hydrochloride is agitated at room temperature with a small percentage of a suitable activated carbon such as Nuchar C-1000, filtered and mixed with 10-15 volumes of acetone, a high yield of streptomycin hydrochloride of substantially increased potency is obtained.

The acidity of the methanol solution should be adjusted to pH 3-7, preferably pH 6-7, for best results. Substantial purification can, however, be obtained by treating with activated carbon solutions of streptomycin in methanol at pH 8-8.5, filtering and precipitating.

Acid methanol solutions of streptomycin may be brought to a suitable pH value by the addition of methanolic NaOH or KOH. Since, however, this results in the formation of inorganic sodium or potassium salts which must later be removed, we prefer to effect this adjustment by contact of the solution with a solid anion-exchange material such, for example, as Amberlite IR-4 (sold by the Resinous Products and Chemical Co. of Philadelphia) or equivalent. These materials are sold and ordinarily used with a substantial water content; they are inactive when completely dry. They would not be satisfactory for our purposes in the wet form, since they would introduce an undesired amount of water into the methanol solution. It has been found, however, that if they are sucked dry on a vacuum filter, slurried with methanol and drained, they may be brought to a state of reduced water content in which they will still effect anion exchange without introducing any deleterious amount of water into the solution. In the present invention these exchange materials are used in the active form, i. e. in a condition to effect substantial neutralization of the treated solution. When inactivated by use they are reactivated, e. g. by treating with a sodium carbonate solution.

Best results are obtained by carbon-treating relatively dilute solutions, e. g. those having potencies of approximately 50 to 300 u./ml., preferably approximately 100 to 200 u./ml. The invention, however, is workable with more concentrated solutions, e. g. 600-700 u./ml., with the sacrifice of considerable yield. Since more dilute solutions give better results both as to potency and yield, the limiting factor is largely economic, viz. the cost and consumption of solvents and precipitants, and the best conditions will be determined in considerable part by the size of operations, efficiency of solvent-recovery equipment and the like. Because dilute solutions are preferred, our invention is particularly applicable to the treatment of eluates obtained in streptomycin and streptothricin production. Examples are given below.

While ethanol and ethanol-water mixtures have been employed in streptomycin recovery, we have found methanol to be the preferred solvent for use in our process. The methanol used should have a low water content, preferably not over about 3%. With higher water content, e. g. 10%, there is a greater but less selective adsorption of solids by the activated carbon in our first step, and a greater tendency for the streptomycin hydrochloride to be gummy in our second step. An excessive water content thus contributes both to lower yield and lower potency of the final product.

Ethyl ether may be used as the precipitant in our second step, and has the advantage that only 2-3 volumes are required. We prefer to use acetone, however, in spite of the fact that 10-15 volumes must be used. Among the reasons for this preference are: less sensitivity to the presence of water in the methanol, less tendency to form gummy precipitates, greater selectivity in precipitation especially as respects inorganic salts, higher boiling point and somewhat less fire hazard. Dioxane can also be used satisfactorily in place of acetone in substantially the same amounts.

The following examples illustrate the degree of purification effected and the yields obtained in practicing our invention. These examples are intended to be illustrative only, and not to limit our invention, the scope of which is defined in the appended claims.

*Example 1*

A solution of crude streptomycin hydrochloride in substantially water-free methanol was prepared; the reaction was nearly neutral (pH 6-7). The crude streptomycin had a potency of 40 u./mg. and the solution had a potency concentration of 138 u./ml. Seventy-five ml. portions of the solution were treated, respectively, with the amounts of activated carbon indicated in the table by stirring solution and carbon at room temperature for approximately a half hour and filtering. Sixty ml. portions of the filtrate were stirred with 900 ml. portions of acetone; the precipitates were collected, dried and assayed.

The results are summarized in the following table in which: the first column gives the amount of carbon used in grams per 100 hundred milliliters of solution, i. e. weight-volume percent;

the second column gives the total units of potency found by assay in each portion of solution after carbon treatment; the third column gives percentage of potency remaining after carbon treatment, taking the potency of the sample treated with 0.0 carbon (first line of table) as 100; and the fourth column gives the potency per milligram of the several precipitates.

| Activated carbon, g./100 ml. | Potency, Total u. after carbon treatment | Recovery after carbon treatment, percent | Potency of precipitated product, u./mg. |
|---|---|---|---|
| 0.0 | 10,200 | 100 | 92 |
| 0.5 | 10,700 | 105 | 132 |
| 1.0 | 9,550 | 94 | 204 |
| 2.0 | 9,600 | 94 | 324 |
| 3.0 | 9,050 | 89 | 384 |

Under the conditions of these experiments the optimum amount of carbon was 2–3%; loss by treatment with 2% carbon was only 6%; ratio of increase of potency with precipitation only was approximately 2, with 2% carbon plus precipitation, 8, and with 3% carbon plus precipitation, over 9.

*Example 2*

That neither carbon treatment alone nor precipitation alone will effect the purification achieved by our invention is further shown by the following experiments.

a. A 75 ml. portion of a streptomycin HCl-methanol eluate was adjusted to a pH of 6.6; the eluate had a potency of 102 u./ml., the dissolved streptomycin hydrochloride, 34 u./mg. The eluate was stirred for 20 minutes with 2% Nuchar C-1000 and filtered. A portion of the filtrate was evaporated to dryness in a vacuum desiccator; the residue assayed 31 u./mg. Another portion of the filtrate was stirred with 15 volumes of acetone; the dried precipitate assayed 216 u./mg.

In this experiment carbon treatment alone failed to increase the potency of the product, while carbon treatment, followed by selective precipitation, increased the potency approximately sixfold.

b. A methanol solution of streptomycin hydrochloride was prepared having a potency of 138 u./ml.; the dissolved material had a potency of 40 u./mg. A portion of this solution was mixed with 15 volumes of acetone; the dried precipitate assayed 67 u./mg. Another portion of the solution was treated with 3% activated carbon as in experiment a, and filtered. The filtrate was mixed with 15 volumes acetone; the dried precipitate assayed 340 u./mg.

In this experiment acetone precipitation alone caused only a moderate gain in potency (approximately 70%), while carbon treatment followed by precipitation effected more than an eightfold increase in potency.

*Example 3*

The following experiment illustrates the application of our invention to streptothricin.

A solution of streptothricin hydrochloride in methanol was made up and adjusted to a pH of 6.9; the potency of the solution was 380 u./ml. and of the dissolved streptothricin hydrochloride 67 u./mg. The solution was divided into two portions, one of which was treated with 4 percent activated carbon (Nuchar C-1000) pH 6.9 and the other of which was treated with 4 percent of the same carbon after having been made 0.1 N acid by adding a small amount of concentrated aqueous HCl. After stirring with the carbon at room temperature for approximately ½ hour, the two portions were filtered and the total potencies of each filtrate determined by assay. The nearly neutral solution (pH 6.9) retained 75 percent of its total potency and the slightly acid solution (0.1 N. HCl) retained 82 percent. The portions were each separately mixed with a large excess of acetone, the precipitates separated and dried, and their potencies determined. The precipitate from the nearly neutral solution had a potency of 170 u./mg., while that from the slightly acid solution had a potency of 141 u./mg. The two-step treatment thus resulted in each case in a more than twofold increase in potency.

*Example 4*

The application of our method to streptomycin in a weakly alkaline alcoholic solution is illustrated in the following experiment.

A methanol solution of streptomycin hydrochloride having a potency of 40 u./mg. was prepared, the solution having a potency of 500 u./ml. The pH of the solution was raised to 8.5, the solution stirred for ½ hour with 2.5 percent activated carbon (Nuchar C-1000) and filtered. The basic streptomycin compound was precipitated with acetone, dried, weighed and assayed. Its potency was 114 u./mg. and the overall yield, based on potencies, was 44 percent.

The basic compound was dissolved in methanol, 1.92 g. in 400 ml. methanol. The solution was stirred with 1 percent activated carbon (Nuchar C-1000) and filtered. The filtrate was then acidified by the addition of concentrated HCl. The hydrochloride was precipitated with acetone, dried, weighed and assayed. Its potency was 347 u./mg. and the yield of this stage, based on potencies, was 55 percent. The combined yield of the two stages, each comprising a carbon treatment and selective precipitation, was 24 percent.

*Example 5*

The application of our two-step purification method to streptomycin recovery from broth obtained in streptomycin production is illustrated in the following experiments.

a. Three hundred and fifty liters of a broth from a surface culture of Streptomyces griseus, having a potency concentration of 73.5 u./ml. (average of two 175 liter portions) and an approximate antibiotic content equivalent to 25,725,000 u., was stirred for ½ hour, after clarification, with 1.5 percent activated carbon (Nuchar XXX) and filtered. The carbon adsorbate was washed successively with water, acetone and methanol. The activities of the washings were: water, nil; methanol, 3 u./ml.; acetone, nil. The washed carbon adsorbate was then eluted twice, each time with 58 l. 0.1 N methanolic HCl made by adding concentrated aqueous HCl to methanol. Elution was accomplished by stirring one hour and filtering. The eluates were separately adjusted to pH 6.5 and treated with 1 percent activated carbon (Nuchar C-750) by stirring ½ hour at room temperature and filtering. The respective antibiotic activities of the eluates were then equivalent to:

|  | Units |
|---|---|
| Eluate I | 14,030,000 |
| Eluate II | 3,770,000 |
| Total | 17,800,000 | representing 69 percent of the original antibiotic activity of the broth.

The carbon-treated eluates were then evaporated to small volume in vacuo, eluate I to 1.9 l. and eluate II to 1.4 l. Each concentrate was mixed with a large volume of acetone after clarification, and the resulting precipitate separated, dried and assayed.

Eluate I yielded 57.7 g. streptomycin hydrochloride having a potency of 210 u./mg. or a total potency of approximately 12,117,000 u. The yield from eluate II was 27.7 g. having a potency of 180 u./mg. or a total potency of 4,886,000 u. In terms of units of potency the overall recovery was approximately 17,003,000 u. This is 66 percent of the potency of the broth and 95 percent of the potency of the eluates.

b. For comparison figures are given on a streptomycin production run in which our invention was not used.

One hundred and seventy liters of a broth from a surface culture of Streptomyces griseus, having a potency concentration of 80 u./ml. and an approximate antibiotic content equivalent to 13,600,000 u., was stirred for ½ hour, after clarification, with 1 percent activated carbon (Nuchar XXX) and filtered. The carbon adsorbate was washed as in experiment a, all washings showing zero potency. The washed adsorbate was then eluted with two successive 28-l. portions of 0.1 N methanolic HCl. The first eluate (I) had antibiotic activity equivalent to 6,860,000 u., the second (II), 1,036,000 u. The total activity of the two eluates was 7,896,000 u., or 58 percent of the antibiotic activity of the broth.

On precipitation with acetone as in experiment a, but without carbon treatment, eluate I yielded 65.6 g. streptomycin hydrochloride having a potency of 97 u./mg., or a total of 6,363,000 u., and eluate II yielded 24.8 g. having a potency of 45 u./mg., or a total of 1,115,000 u. The combined potencies of the two fractions was 7,478,000 u.; this represents a yield, in terms of potencies, of 55 percent of the total broth potency and 95 percent of the potencies of the eluates.

From the data of this example (b) it will be seen that the application of our invention to the recovery of streptomycin from broth resulted in a product of greatly improved potency, while the percentage yield, based on potencies, was maintained at an economically practical level.

In all the above examples the stated percentages of activated carbon used to treat the various solutions mentioned are in terms of weight : volume percent; e. g. a treatment with 1 percent activated carbon involves using 10 g. activated carbon per liter of solution.

Our invention may be applied not only to the hydrochloride but also to other water-soluble salts of streptomycin such as the sulfate.

We claim:

1. The process of purifying an antibiotic selected from the group consisting of the water-soluble salts of streptomycin and streptothricin which comprises: treating a dilute faintly-acid-to-neutral solution of said antibiotic in a saturated alcohol containing not more than two carbon atoms with a small percentage of activated carbon adapted to condition the carbon-treated solution to yield an antibiotic of enhanced potency by selective precipitation, removing the carbon, and selectively precipitating an antibiotic of enhanced potency from the carbon-treated solution by adding thereto a volatile oxygen-containing organic liquid which is a non-solvent for the antibiotic and is miscible with the solution.

2. The process defined in claim 1, in which selective precipitation is effected by adding to the carbon-treated solution a mono ketone containing not more than four carbon atoms in the molecule.

3. The process defined in claim 1, in which selective precipitation is effected by adding to the carbon-treated solution an ether having no more than four carbon atoms in the molecule.

4. The process defined in claim 1, in which selective precipitation is effected by adding acetone to the carbon-treated solution.

5. The process defined in claim 1, in which the carbon-treated solution has a pH in the range 3–7 and contains less than 10 percent water.

6. The process of purifying streptomycin, which comprises: preparing a dilute methanol solution of a water-soluble salt of streptomycin, said methanol solution having a pH in the range 3–7, agitating the solution with a small percentage of activated carbon adapted to condition the carbon-treated solution to yield streptomycin of enhanced potency by selective precipitation, removing the carbon, and selectively precipitating streptomycin of enhanced potency from the carbon-treated solution by mixing with the solution several times its volume of a non-solvent for streptomycin selected from the group consisting of ethyl ether, acetone and dioxane.

7. The process of purifying streptomycin hydrochloride, which comprises: agitating a dilute methanol solution of streptomycin hydrochloride having a pH in the range 3–7 with a small percentage of activated carbon adapted to condition the carbon-treated solution to yield streptomycin of enhanced potency by selective precipitation, removing the carbon, and selectively precipitating streptomycin hydrochloride of enhanced potency from the carbon-treated solution by mixing with the solution a multiple volume of acetone.

8. The process defined in claim 6, in which the methanol solution prior to carbon treatment has a potency concentration of not over 300 u./ml. and after carbon treatment has a pH in the range of 6–7 and a water content of not over about 3 percent.

9. The process defined in claim 6, in which a carbon-treated methanol solution of streptomycin hydrochloride having a pH in the range 6–7 and a water content of not over about 3 percent is subjected to low-temperature concentration prior to selective precipitation.

10. In a process of recovering an antibiotic from a culture broth containing said antibiotic, said antibiotic being selected from the group consisting of streptomycin and streptothricin, which comprises adsorbing said antibiotic to a solid adsorbent, removing from the resulting adsorbate unadsorbed broth constituents and water, and eluting the adsorbate with a dilute methanol solution of an acid which forms a water-soluble salt with said antibiotic and is of sufficient strength to remove said antibiotic from the adsorbate, the improvement which comprises: regulating the elution to yield an eluate having a potency concentration of not over about 600 u./ml., adjusting the pH of the eluate to fall within the range 3–7, agitating the eluate with a small percentage of activated carbon adapted to condition the carbon-treated eluate to yield an antibiotic of enhanced potency by selective precipitation, removing the carbon, and selectively precipitating the antibiotic from the carbon-treated eluate by mixing with the eluate several times its volume of a non-solvent for the antibiotic selected from the group consisting of ethyl ether, acetone and dioxane.

11. In the recovery of an antibiotic of the group consisting of streptomycin and streptothricin from a culture broth containing said antibiotic by a process in which said antibiotic is adsorbed to a solid adsorbent and then eluted therefrom with a dilute methanol solution of an acid forming a water-soluble salt with the antibiotic, the steps which comprise treating the resulting eluate at a pH of 3-7 with activated carbon adapted to condition the carbon-treated eluate to yield an antibiotic of enhanced potency by selective precipitation, removing the carbon, and selectively precipitating an antibiotic of enhanced potency by mixing with the carbon-treated eluate several times its volume of a non-solvent for the antibiotic selected from the group consisting of ethyl ether, acetone and dioxane.

12. The steps defined in claim 10, in which the eluate contains streptomycin hydrochloride, its potency concentration is not over about 300 u./mg., and its water content not over about 3 percent.

HARVEY E. ALBURN.
ERIC G. SNYDER.

REFERENCES CITED

The following references are of record in the file of this patent:

Cheronis: "Semimicro- and Macro-Organic Chemistry" (New York, Crowell, 1942), pages 207–210.

Schatz et al.: Proc. Soc. Exptl. Biol. Med., vol. 55 (1944), pages 66–69.

Waksman (2): J. Bact., vol. 46 (1943), pages 299–310.